United States Patent [19]
Hironaka

[11] Patent Number: 5,601,275
[45] Date of Patent: Feb. 11, 1997

[54] SOLENOID OPERATED VALVE

[75] Inventor: Hideharu Hironaka, Kariya, Japan

[73] Assignee: Aisin Seiki Kabushiki Kaisha, Aichi-ken, Japan

[21] Appl. No.: 507,609

[22] Filed: Jul. 26, 1995

[30] Foreign Application Priority Data

Jul. 29, 1994 [JP] Japan .................................. 6-178918
Apr. 17, 1995 [JP] Japan .................................. 7-091137

[51] Int. Cl.$^6$ .................................................. F16K 31/06
[52] U.S. Cl. .......................... 251/129.15; 251/48; 251/50
[58] Field of Search ........................ 251/129.15, 129.01, 251/48, 50, 51; 335/255, 260, 278, 247, 257, 271, 277, 279

[56] References Cited

U.S. PATENT DOCUMENTS

| | | | |
|---|---|---|---|
| 2,217,141 | 10/1940 | Sprenkle | 251/50 X |
| 5,118,076 | 6/1992 | Homes | 251/50 X |
| 5,401,087 | 3/1995 | Goossens | 251/129.15 X |
| 5,460,350 | 10/1995 | Nagashima et al. | 251/129.15 |

FOREIGN PATENT DOCUMENTS 4-266676  9/1992  Japan .

*Primary Examiner*—Kevin Lee
*Attorney, Agent, or Firm*—Hazel & Thomas

[57] ABSTRACT

A solenoid operated valve having a solenoid winding mounted on a valve housing formed with a valve chamber, an end closed sleeve concentrically assembled with the solenoid winding, a stationary element disposed within the end closed sleeve and mounted on the valve housing together with the end closed sleeve to form a fluid chamber in a closed end portion of the sleeve, the fluid chamber being communicated with the valve chamber through an axial bore of the stationary element, a movable element disposed within the fluid chamber to be moved toward the stationary element against a return spring loaded thereto when the solenoid winding is activated, a movable valve rod engaged at one end thereof with the movable element for movement therewith and extending into the valve chamber through the axial bore of the stationary element, a valve body disposed within the valve chamber to be moved by the valve rod, and a valve seat mounted within the valve chamber and located between an inlet passage and an outlet passage to be closed by the valve body, wherein a hydraulic damping mechanism is composed of an annular sealing member coupled with the movable element and slidably engaged with an internal surface of the end closed sleeve to form a damper chamber and an orifice formed in the movable element to provide a fluid communication between the damper chamber and the valve chamber.

11 Claims, 6 Drawing Sheets

SOLENOID OPERATED VALVE

BACKGROUND OF THE INVENTION

1. Field of the Invention

The present invention relates to a solenoid operated valve for permitting or interrupting the flow of hydraulic fluid passing therethrough, and more particularly to a solenoid operated valve adapted for use in a skid-control apparatus, a traction control apparatus or the like in a braking system of an automotive vehicle.

2. Description of the Prior Art

Disclosed in Japanese Patent Laid-open Publication No. 4(1992)-266676 is a solenoid operated valve of this kind which includes a valve housing formed with a valve chamber, an end closed sleeve concentrically assembled within the solenoid winding and having an opening end mounted on the valve housing, a stationary element mounted within the end closed sleeve, a movable element axially movably mounted within an closed end portion of the sleeve to be moved toward the stationary element against a return spring loaded thereto when the solenoid winding is energized, a movable valve rod concentrically assembled within the stationary element for movement with the movable element, a valve body integrally provided with a distal end of the movable valve rod and located in the valve chamber, a valve seat mounted within the valve chamber and having a valve hole to be closed by the valve body, and a hydraulic damping mechanism for restraining movement of the valve body in operation of the solenoid operated valve. In the solenoid operated valve, the damping mechanism is designed to reduce mechanical noises in operation of the solenoid operated valve and to restrain sudden restriction or expansion of a fluid passage formed between the valve seat and valve body.

In the solenoid operated valve, the return spring is disposed between the valve body and the valve seat, a check valve with a throttle acting as a hydraulic damper is disposed within a cylinder portion formed in the stationary element in surrounding relationship with the movable valve rod, and an orifice is formed by a portion of the valve hole. The check valve is assembled with the movable valve rod for permitting the flow of hydraulic fluid into a damper chamber formed between the movable valve rod and the cylinder portion of the stationary element and associated with an annular throttle passage formed between a ring disc of the check valve and the cylinder portion of the stationary element or an orifice formed in the cylinder portion of the stationary element.

In the solenoid operated valve, sufficient damping function may not be effected for the following reasons.

1) A sufficient displacement capacity of the damper chamber may not be obtained during movement of the valve body.
2) The damping function of the check valve is effected only when the valve body is moved in one direction.
3) The orifice formed in the valve hole acts to throttle the flow of hydraulic fluid only at an initial stage of closing operation of the valve body and also at the last stage of opening operation of the valve body. This means that the damping function is effected only in a condition where the opening area of the fluid passage formed between the valve body and valve seat becomes less than the opening area of the orifice. In other words, the damping function is effected only by a portion of the entire movement amount of the valve body.

SUMMARY OF THE INVENTION

It is, therefore, a primary object of the present invention to provide a solenoid operated valve wherein the damping function of the valve body can be sufficiently effected to restrain mechanical noises in operation of the solenoid operated valve and to restrain the occurrence of noises caused by sudden change in pressure of the hydraulic fluid.

According to the present invention, the object is accomplished by providing a solenoid operated valve having a valve housing formed with a valve chamber positioned between an inlet passage and an outlet passage, a solenoid winding mounted on the valve housing, an end closed sleeve concentrically assembled with the solenoid winding and having an opening end mounted on the valve housing, a stationary element disposed within the end closed sleeve and mounted on the valve housing together with the end closed sleeve to form a fluid chamber in a closed end portion of the sleeve, the fluid chamber being communicated with the valve chamber through an axial bore of the stationary element, a movable element disposed within the fluid chamber to be moved toward the stationary element against a return spring loaded thereto when the solenoid winding is activated, a movable valve rod engaged at one end thereof with the movable element for movement therewith and extending into the valve chamber through the axial bore of the stationary element, a valve body disposed within the valve chamber to be moved by the valve rod, and a valve seat mounted within the valve chamber and located between the inlet and outlet passages to be closed by the valve body, wherein a hydraulic damping mechanism is composed of an annular sealing member coupled with the movable element and slidably engaged with an internal surface of the end closed sleeve to form a damper chamber and fluid restriction means arranged to provide a fluid communication between the damper chamber and the valve chamber.

According an aspect of the present invention, there is provided a solenoid operated valve having a valve housing formed with a valve chamber positioned between an inlet passage and an outlet passage, a solenoid winding mounted on the valve housing, an end closed sleeve concentrically assembled with the solenoid winding and having an opening end mounted on the valve housing, a stationary element disposed within the end closed sleeve and mounted on the valve housing together with the end closed sleeve to form a fluid chamber in a closed end portion of the sleeve, the stationary element having a cylinder portion extending into the valve chamber, a movable element disposed within the fluid chamber to be moved toward the stationary element against a return spring loaded thereto when the solenoid winding is activated, a movable valve rod engaged at one end thereof with the movable element for movement therewith and extending into the cylinder portion of the stationary element through an axial bore of the stationary element, a valve body axially movably disposed within the cylinder portion of the stationary element to be moved by the valve rod, and a valve seat mounted within the valve chamber and located between the inlet and outlet passages to be closed by the valve body, wherein a hydraulic damping mechanism is composed of an annular sealing member coupled with the valve body and slidably engaged with an internal surface of the cylinder portion of the stationary element to form a damper chamber and fluid restriction means arranged to provide a fluid communication between the damper chamber and the valve chamber.

According to another aspect of the present invention, there is provided a solenoid operated valve having a valve housing formed with a valve chamber positioned between an inlet passage and an outlet passage, a solenoid winding mounted on the valve housing, an end closed sleeve concentrically assembled with the solenoid winding and having an opening end mounted on the valve housing, a stationary element disposed within an closed end portion of the sleeve and fixed in place, a movable element disposed within the end closed sleeve to be moved toward the stationary element against a return spring loaded thereto when the solenoid winding is activated, a movable valve rod engaged with the movable element for movement therewith and extending into the valve chamber, a valve body disposed within the valve chamber to be moved by the valve rod, and a valve seat mounted within the valve chamber and located between the inlet and outlet passages to be normally closed by the valve body, wherein a hydraulic damping mechanism is composed of an annular sealing member coupled with the movable element and slidably engaged with an internal surface of the sleeve to form a damper chamber and fluid restriction means arranged to provide a fluid communication between the damper chamber and the valve chamber.

BRIEF DESCRIPTION OF THE DRAWINGS

Other objects, features and advantages of the present invention will be more readily appreciated from the following detailed description of preferred embodiments thereof when taken together with the accompanying drawings, in which.

DESCRIPTION OF THE PREFERRED EMBODIMENTS

Figure 1:
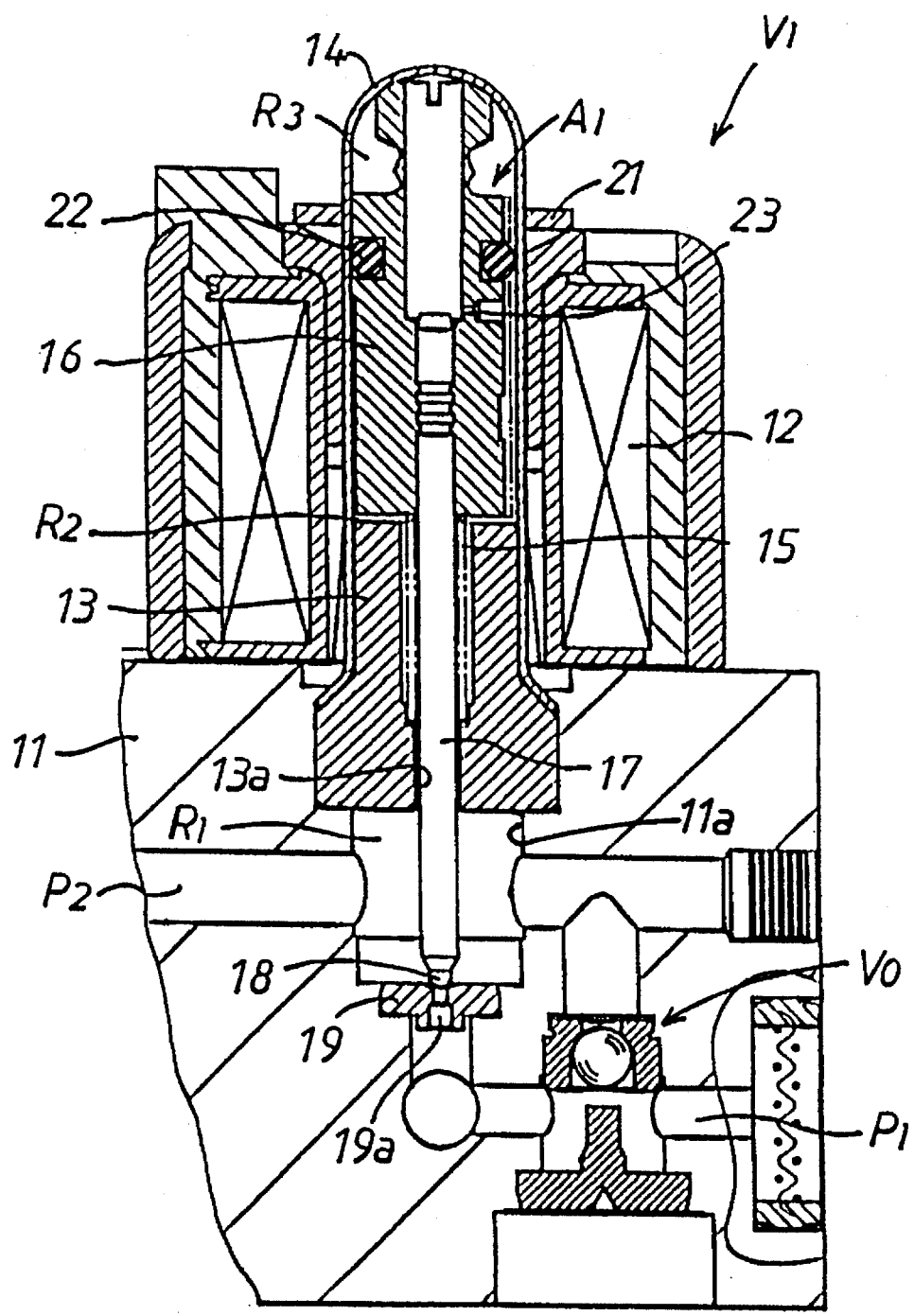
FIG. 1 is a sectional view of a first embodiment of a solenoid operated valve in accordance with the present invention.

In FIG. 1 of the drawings, there is illustrated a solenoid operated valve V1 of the normally open type in accordance with the present invention, which is adapted to permit or interrupt the flow of hydraulic fluid between an inlet passage P1 connected to a master cylinder (not shown) in a hydraulic braking apparatus of an automotive vehicle and an outlet passage P2 connected to a wheel cylinder (not shown). The solenoid operated valve V1 includes a valve housing 11 formed with the inlet and outlet passages P1 and P2, a solenoid winding 12, a tubular stationary element an end closed sleeve 14, a return spring 15, a movable element 16, a movable valve rod 17, a valve body 18 and a valve seat 19 assembled with the valve housing 11, and a hydraulic damping mechanism A1 for restraining movement of the valve body 18. The valve housing 11 is provided therein with a check valve Vo for permitting the flow of hydraulic fluid discharged from the outlet passage P2 into the inlet passage P1.

The solenoid winding 12 is concentrically assembled with the end closed sleeve 14 and fixed in place by a retainer clip 21. Thus, the solenoid winding 12 is mounted on the valve housing 11 through the end closed sleeve 14. The tubular stationary element 13 is concentrically coupled within the end closed sleeve 14 and mounted within a large diameter portion of a stepped mounting bore 11a of valve housing 11 together with the end closed sleeve 14. As clearly shown in FIG. 2, the stationary element 13 is fixed to the valve housing 11 together with the end closed sleeve 14 in a liquid-tight manner by annularly staking a shoulder portion 11b of the valve housing 11. Formed within the sleeve 14 is a fluid chamber R2 which is communicated with a valve chamber R1 formed in the valve housing 11 through an axial bore 13a of the stationary element 13.

Figure 2:
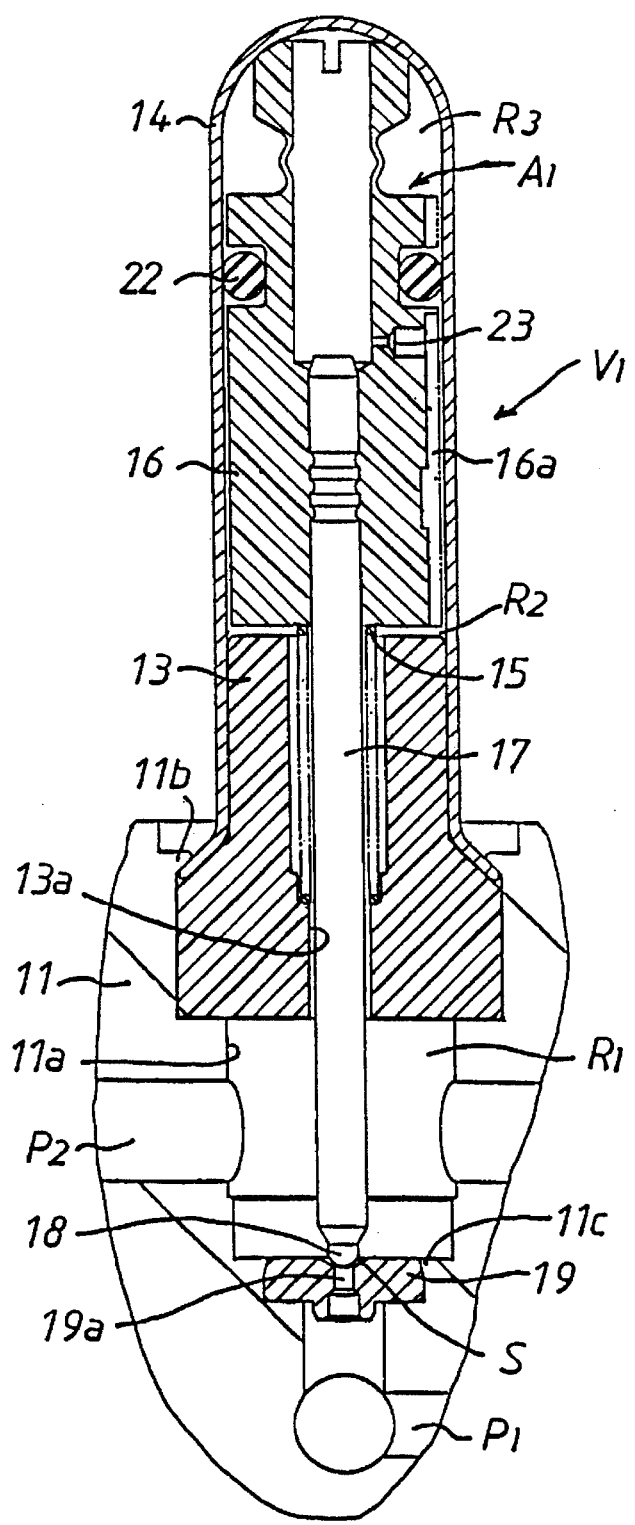
FIG. 2 is an enlarged sectional view of a portion of the solenoid operated valve shown in FIG. 1.

The movable element 16 is disposed within the fluid chamber R2 and loaded upwards by means of the return spring 15 which is received by the stationary element 13. When the solenoid winding 12 is activated, the movable element 16 is moved against the return spring 15 toward the stationary element 13. The valve rod 17 has an upper end portion connected to the movable element 16 and a lower end portion extending into the valve chamber R1 through the axial bore 13a of stationary element 13. The valve body 18 is integrally provided with a distal end of valve rod 17 to be moved with the movable element 16. The valve seat 19 is coupled within a small diameter portion of the stepped mounting bore 11a of valve housing 11 and fixed to the valve housing 11 in a liquid-tight manner by annularly staking a shoulder portion 11c of valve housing 11. Thus, an annular throttle S is formed between the valve body 18 and a valve hole 19a of valve seat 19 in a condition where the valve body 18 is slightly spaced from the valve seat 19 as shown in FIG. 2.

The hydraulic damping mechanism A1 is composed of an annular sealing member 22 in the form of an O-ring of synthetic rubber and an orifice 23 formed in the movable element 16. The sealing member 22 is coupled within an annular groove of the movable element 16 and slidably engaged with an internal surface of the sleeve 14 to form a damper chamber R3 in the closed end portion of sleeve 14. The damper chamber R3 is communicated with the valve chamber R1 through the orifice 23, an axial groove 16a formed on the movable element 16, a space between the movable element 16 and stationary element 13 and the axial bore 13a of stationary element 13.

In the solenoid operated valve V1, the solenoid winding 12 is activated in braking operation of the vehicle to move the movable element 16 toward the stationary element 13 against the return spring 15 so that the valve hole 19a of valve seat 19 is closed by the valve body 18 to interrupt the flow of hydraulic fluid supplied from the inlet passage P1 into the outlet passage P2. When the solenoid winding 12 is deactivated, the movable element 16 is moved by the return spring 15 to separate the valve body 18 from the valve seat 19 in a predetermined distance thereby to permit the flow of hydraulic fluid supplied from the inlet passage P1 into the outlet passage P2 through the throttle S formed by the valve body 18 and the valve hole 19a of valve seat 19. When the braking operation is released, the flow of hydraulic fluid discharged from the outlet passage P2 into the inlet passage P1 is permitted through the check valve Vo.

In the solenoid operated valve V1, the damping mechanism A1 is composed of the sealing member 22 disposed between the sleeve 14 and movable element 16 to form the damper chamber R3 in the closed end portion of sleeve 14 and the orifice 23 located in the fluid communication passage between the valve chamber R1 and damper chamber R3. In such a construction of the damping mechanism A1, the displacement capacity of damper chamber R3 during movement of the movable element 16 is defined by the pressure receiving area and displacement amount of the movable element 16. Thus, a sufficient damping function can be effected at the damper chamber R3. Additionally, a damping function is effected by the flow of hydraulic fluid passing through the orifice 23 during movement of the movable element 16. The damping function is effected in closing operation of the valve body 18 and also in opening operation of the valve body 18. Since the throttle S is formed by the valve body 18 and the valve hole 19a of valve seat 19 in a condition where the valve body 18 is spaced from the valve seat 19, the damping function of the damping mechanism A1 is effected in the entire period during which the valve body 18 is moved to close or open the valve seat 19. Thus, a sufficient damping function is effected by the damping mechanism A1 to restrain mechanical noises in operation of the solenoid operated valve V1 and to restrain the occurrence of noises caused by sudden change in pressure of the hydraulic fluid.

Figure 3:
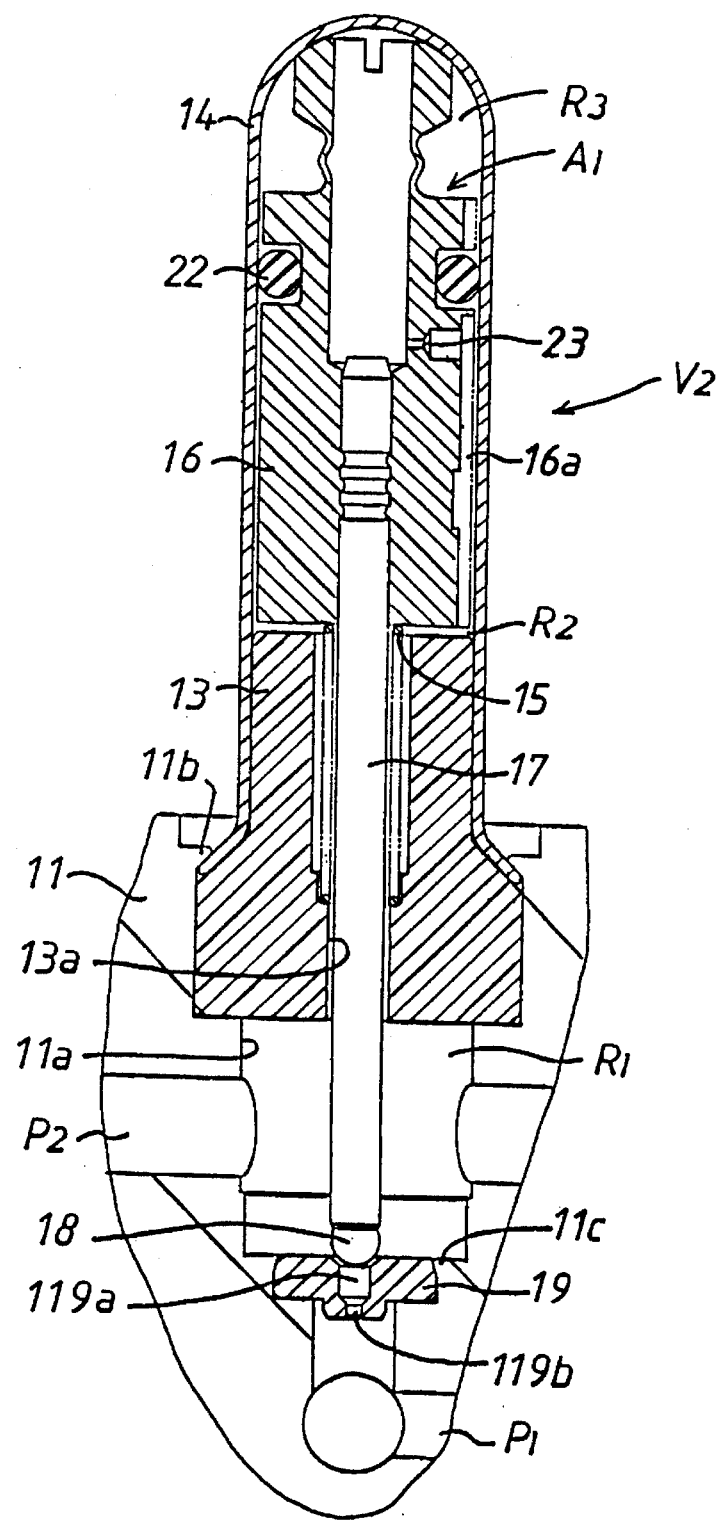
FIG. 3 is an enlarged sectional view of a portion of a second embodiment of a solenoid operated valve in accordance with the present invention.

Although in the solenoid operated valve V1 shown in FIGS. 1 and 2, the throttle S is formed by the valve body 18 and the valve hole 19a of valve seat 19 in a condition where the valve body 18 is spaced from the valve seat 19, the solenoid operated valve V1 may be modified as in a solenoid operated valve V2 shown in FIG. 3, wherein an orifice 119b is formed within the valve hole 19a of valve seat 19 at a position where the valve body 18 does not act to close or open the orifice 119b. In the solenoid operated valve V2, the annular passage formed by the valve body 18 and the valve hole 19a of valve seat 19 becomes larger than the opening area of orifice 119b when the valve body 18 is spaced from the valve seat 19 as shown in the figure. Thus, the function of the damping mechanism A1 is effected at a region where the annular passage formed by the valve body 18 and the valve hole 19a of valve seat 19 becomes smaller than the opening area of orifice 119b in operation of the solenoid operated valve V2. The other construction and function of the solenoid valve V2 are substantially the same as those of the solenoid operated valve V1 shown in FIGS. 1 and 2. The same or similar component parts as those in the solenoid operated valve V1 are designated by the same or similar reference numerals or characters.

Figure 4:
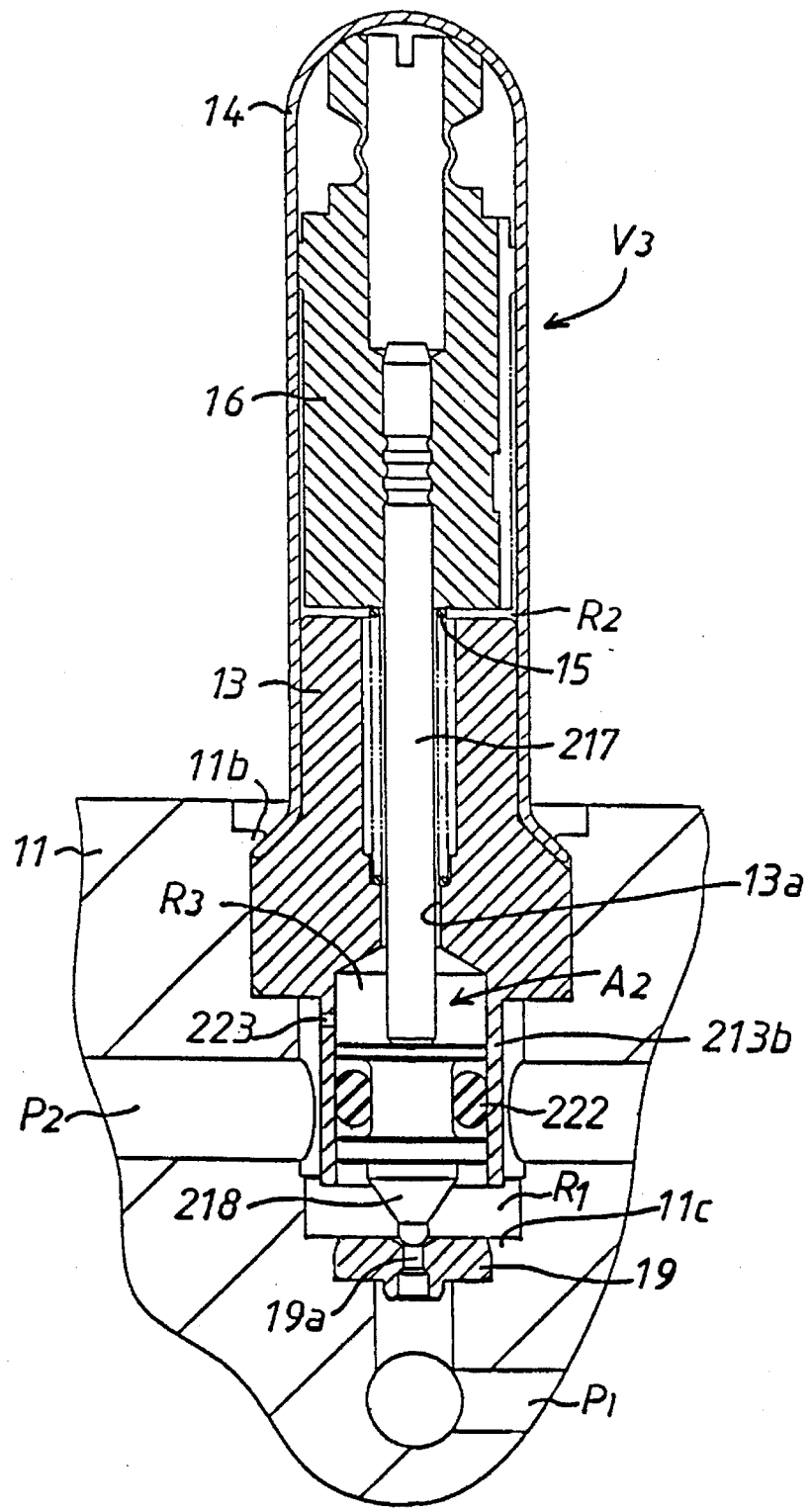
FIG. 4 is an enlarged sectional view of a portion of a third embodiment of a solenoid operated valve in accordance with the present invention.

Although in the above embodiments, the valve body 18 is integrally provided with the distal end of valve rod 17 and the damper chamber R3 is formed in the closed end portion of sleeve 14, the solenoid operated valves V1 and V2 may be modified as in a solenoid operated valve V3 shown in FIG. 4, wherein a valve body 218 is provided separately from a movable valve rod 217 and slidably disposed within a cylinder portion 213b extending from the stationary element 13 into the valve chamber R1, and wherein a hydraulic damping mechanism A2 is composed of a sealing member 222 in the form of an O-ring of synthetic rubber which is coupled with a stem portion of the valve body 218 and slidably engaged with an internal surface of the cylinder portion 213b to form a damper chamber R3 and an orifice 223 which is formed in a peripheral wall of the cylinder portion 213b to provide a fluid communication between the valve chamber R1 and damper chamber R3. Tile sealing member 222 is elastically deformed in rolling action caused by movement of the valve body 218. The other construction of the solenoid valve V3 is substantially the same as that of the solenoid operated valve V1 shown in FIG. 1. The same or similar component parts as those in the solenoid operated valve V1 are designated by the same or similar reference numerals or characters.

In the solenoid operated valve V3 shown in FIG. 4, return movement of the valve body 218 is caused by elastic return action of the sealing member 222 and hydraulic pressure applied to the valve body 218, separately from return movement of the valve rod 217 and movable element 16 caused by the biasing force of return spring 15. Thus, the hydraulic damping mechanism A2 acts to dampen only return movement of the valve body 218 thereby to restrain mechanical noises in operation of the solenoid operated valve V3. When the solenoid operated valve V3 is closed by activation of the solenoid winding 12, the hydraulic damping mechanism A2 acts to dampen movement of the movable element 16, valve rod 217 and valve body 218.

Figure 5:
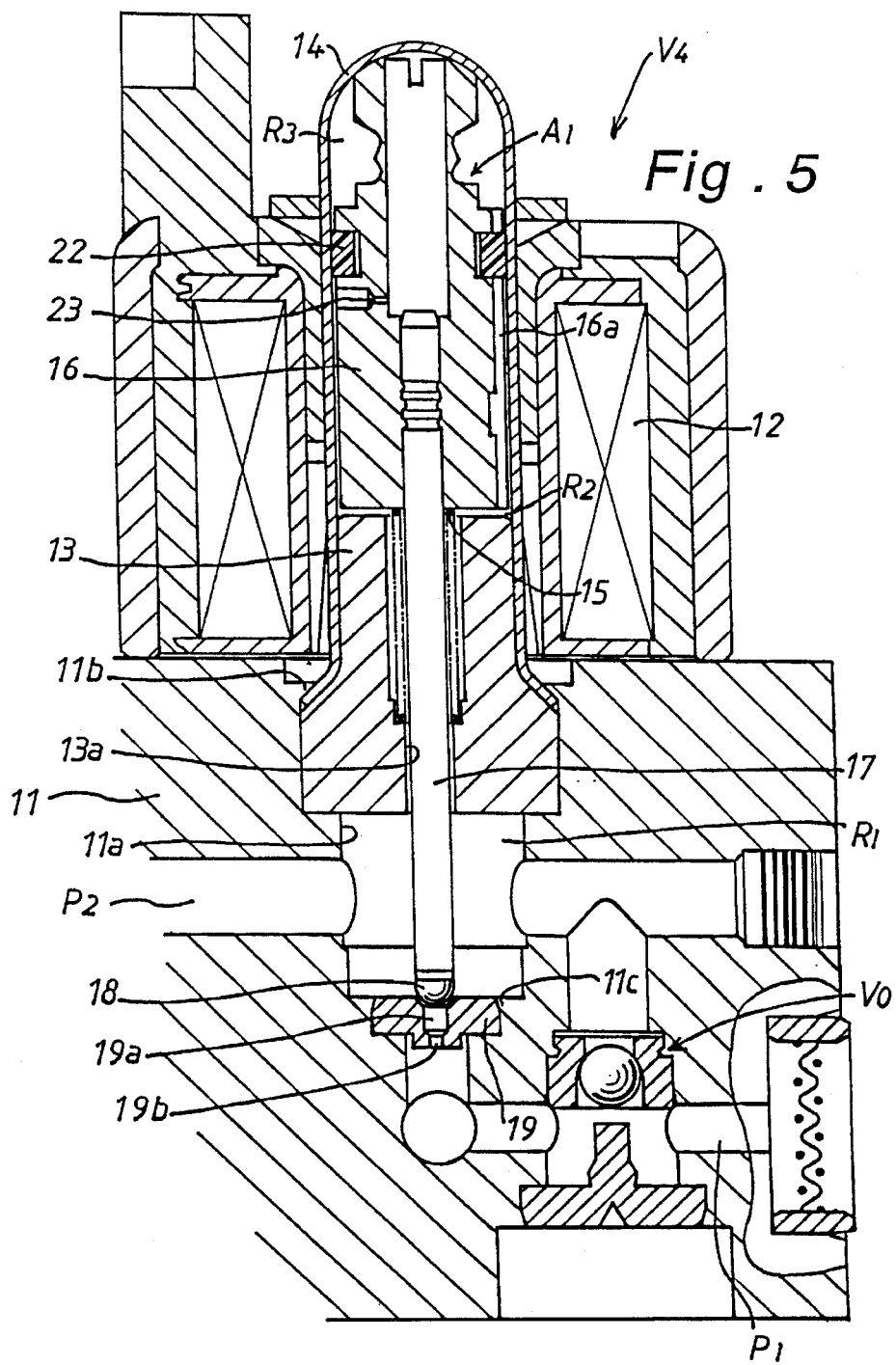
FIG. 5 is a sectional view of a fourth embodiment of a solenoid operated valve in accordance with the present invention.
Figure 6:
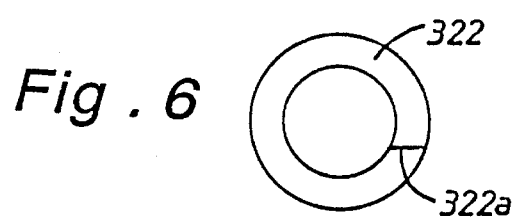
FIG. 6 is a front view of a sealing member of synthetic resin shown in FIG. 5.

Although in the solenoid operated valves V1, V2, a synthetic rubber ring of circular cross-section has been used as the sealing member 22 coupled with the movable element 16, the sealing member 22 may be replaced with an annular sealing member 322 of synthetic resin as in a solenoid operated valve V4 shown in FIG. 5. The annular sealing member 322 has a rectangular cross-section and is formed with an oblique slit 322a at a portion of its circumference as shown in FIG. 6. When assembled with the movable element 16, the sealing member 322 is coupled within an annular groove of movable element 16 in a condition where it has been expanded and is fixed in place by its contraction. In such an assembly process, the sealing member 322 is partly deformed and slidably engaged at its outer circumference with the internal surface of the end closed sleeve 14.

Since the sealing member 322 in the solenoid operated valve V4 is made of synthetic resin, it has appropriate stiffness and becomes more slippery with respect to the sleeve 14 in comparison with the sealing member 22 of synthetic rubber shown in FIGS. 1–3. Accordingly, the movable element 16 can be smoothly inserted into the sleeve 14 without causing any intervention of the sealing member 322 into a space between the movable element 16 and the sleeve 14.

Figure 7:
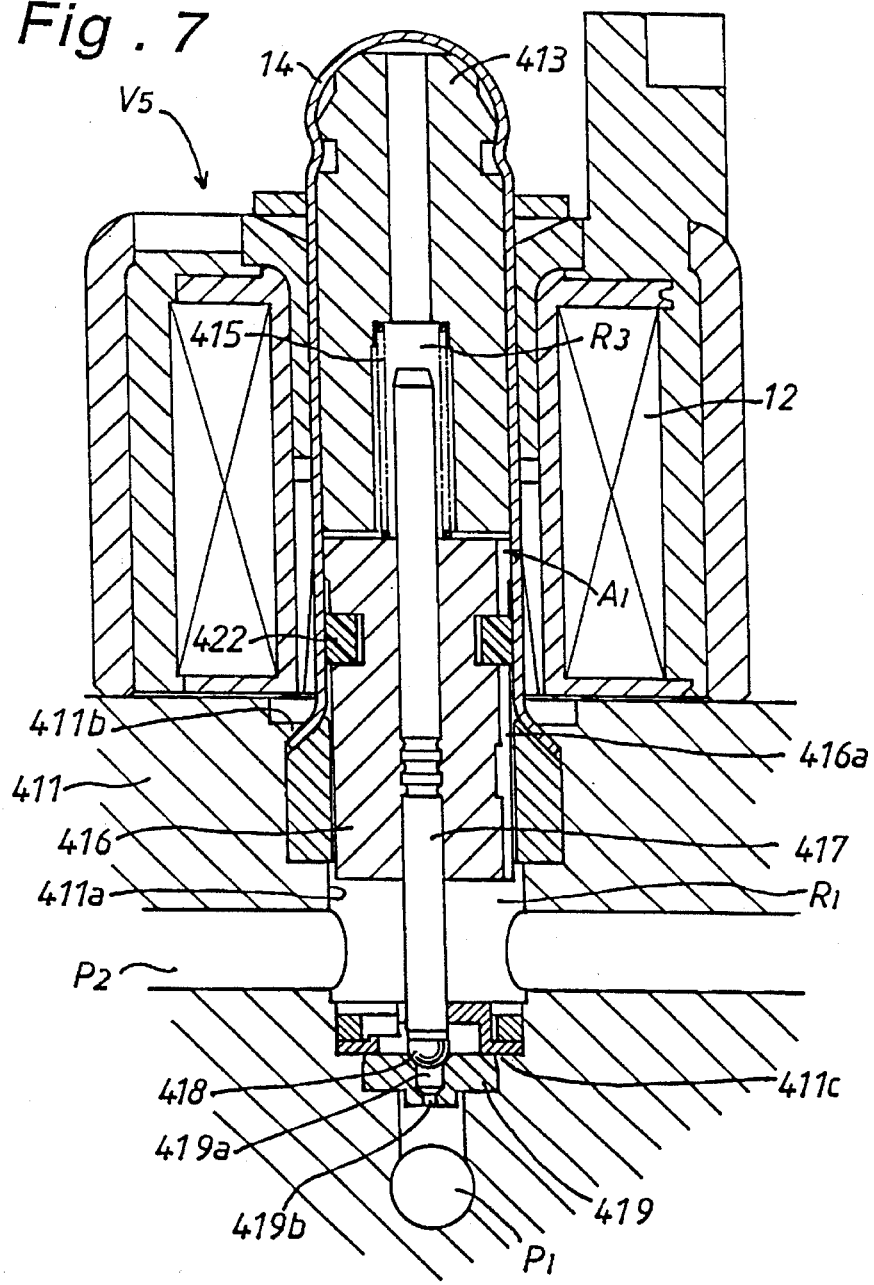
FIG. 7 is a sectional view of a fifth embodiment of a solenoid operated valve in accordance with the present invention.
Figure 8:
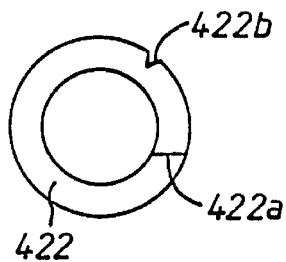
FIG. 8 is a front view of a sealing member of synthetic resin shown in FIG. 7.

In FIG. 7, there is another embodiment of a solenoid operated valve V5 of the normally closed type in accordance with the present invention, wherein a stationary element 413 is fixed in place within a closed end portion of an end closed sleeve 414, and a movable element 416 is disposed between the stationary element 413 and a valve seat 419. In this embodiment, an annular sealing member 422 of synthetic resin is coupled within an annular groove of the movable element 416 and slidably engaged at its outer circumference with an internal surface of the sleeve 414 to form a damper chamber R3. As shown in FIG. 8, the annular sealing member 422 is formed with an oblique slit 422a and an axial V-groove 422b which is associated with the internal surface of the sleeve 413 to form a throttle passage between the valve chamber R1 and the damper chamber R3. The other construction and function of the solenoid operated valve V5 are substantially the same as those of the solenoid operated valve V4 shown in FIG. 5.

What is claimed is:

1. A solenoid operated valve having a valve housing formed with a valve chamber positioned between an inlet passage and an outlet passage; a solenoid winding mounted on said valve housing; an end closed sleeve concentrically assembled with said solenoid winding and having an opening end mounted on said valve housing; a stationary element disposed within said end closed sleeve and mounted on said valve housing together with said end closed sleeve to form a fluid chamber in a closed end portion of said sleeve, said fluid chamber being communicated with said valve chamber through an axial bore of said stationary element; a movable element disposed within said fluid chamber to be moved toward said stationary element against a return spring loaded thereto when said solenoid winding is activated; a movable valve rod engaged at one end thereof with said movable element for movement therewith and extending into said valve chamber through the axial bore of said stationary element; a valve body disposed within said valve chamber to be moved by said valve rod; a valve seat mounted within said valve chamber and located between said inlet and outlet passages to be closed by said valve body; and a hydraulic damping mechanism including an annular sealing member coupled with said movable element and slidably engaged with an internal surface of said end closed sleeve to form a damper chamber and fluid restriction means arranged to provide a fluid communication between said damper chamber and said valve chamber.

2. A solenoid operated valve as recited in claim 1, wherein said fluid restriction means comprises an orifice formed in said movable element to provide a fluid communication between said damper chamber and said valve chamber.

3. A solenoid operated valve as recited in claim 1, wherein said valve body is integrally provided with a distal end of said valve rod.

4. A solenoid operated valve as recited in claim 1, wherein said return spring is disposed between said stationary element and said movable element to bias said movable element toward said damper chamber.

5. A solenoid operated valve as recited in claim 1, wherein a throttle passage is formed between said valve body and a valve hole of said valve seat in a condition where said valve body is spaced from said valve seat.

6. A solenoid operated valve as recited in claim 1, wherein said annular sealing member is made of synthetic rubber and formed to have a circular cross-section.

7. A solenoid operated valve as recited in claim 1, wherein said annular sealing member is made of synthetic resin and formed to have a rectangular cross-section, said sealing member being formed with a slit to be expanded when said sealing member is coupled with said movable element.

8. A solenoid operated valve having a valve housing formed with a valve chamber positioned between an inlet passage and an outlet passage; a solenoid winding mounted on said valve housing; an end closed sleeve concentrically assembled with said solenoid winding and having an opening end mounted on said valve housing; a stationary element disposed within said end closed sleeve and mounted on said valve housing together with said end closed sleeve to form a fluid chamber in a closed end portion of said sleeve, said stationary element having a cylinder portion extending into said valve chamber; a movable element disposed within said fluid chamber to be moved toward said stationary element against a return spring loaded thereto when said solenoid winding is activated; a movable valve rod engaged at one end thereof with said movable element for movement therewith and extending into the cylinder portion through an axial bore of said stationary element; a valve body axially movably disposed within the cylinder portion of said stationary element to be moved by said valve rod; a valve seat mounted within said valve chamber and located between said inlet and outlet passages to be closed by said valve body; and a hydraulic damping mechanism including an annular sealing member coupled with said valve body and slidably engaged with an internal surface of the cylinder portion of said stationary element to form a damper chamber and fluid restriction means arranged to provide a fluid communication between said damper chamber and said valve chamber.

9. A solenoid operated valve as recited in claim 8, wherein said fluid restriction means comprises an orifice formed in a peripheral wall of said cylinder portion to provide a fluid communication between said damper chamber and said valve chamber.

10. A solenoid operated valve having a valve housing formed with a valve chamber positioned between an inlet passage and an outlet passage; a solenoid winding mounted on said valve housing; an end closed sleeve concentrically assembled with said solenoid winding and having an opening end mounted on said valve housing; a stationary element disposed within a closed end portion of said sleeve and fixed in place; a movable element disposed within said end closed sleeve to be moved toward said stationary element against a return spring loaded thereto when said solenoid winding is activated; a movable valve rod engaged with said movable element for movement therewith and extending into said valve chamber; a valve body disposed within said valve chamber to be moved by said valve rod; a valve seat mounted within said valve chamber and located between said inlet and outlet passages to be normally closed by said valve body; and a hydraulic damping mechanism including an annular sealing member coupled with said movable element and slidably engaged with an internal surface of said sleeve to form a damper chamber and fluid restriction means arranged to provide a fluid communication between said damper chamber and said valve chamber.

11. A solenoid operated valve as recited in claim 10, wherein said fluid restriction means comprises an axial groove formed on said sealing member to provide a fluid communication between said damper chamber and said valve chamber.

* * * * *